Patented June 23, 1931

1,811,263

UNITED STATES PATENT OFFICE

AUGUSTUS H. FISKE, OF PROVIDENCE, RHODE ISLAND, ASSIGNOR TO RUMFORD CHEMICAL WORKS, OF PROVIDENCE, RHODE ISLAND, A CORPORATION OF RHODE ISLAND

BAKING POWDER

No Drawing.   Application filed March 2, 1928.   Serial No. 258,694.

In the baking powders of commerce the usual type provides a pair of gas producing reactants dispersed in a diluent or body of carbohydrate such as starch.

My present invention contemplates an improvement of the function of such baking powders by modifying the diluent body to make of it an activator for the batter with a resultant improvement of the batter and a better biscuit or other culinary product made therefrom.

The modification of such a starchy diluent involves certain chemical changes which I believe to be of novel character, but I will herein only treat them as a factor in baking powder manufacture and the production of baked products of so-called baking powder batter origin.

In modifying such a diluent as the starchy body of a baking powder, I produce a product which may be termed an activated carbohydrate, that is to say, one in which a carbohydrate such as a starch or starchy matter, obtainable from tubers, grains or like vegetable growths, is unbalanced as to its chemical formula by a slight oxidizing, not sufficient to be considered as any basis of decay, but just enough to overcome the inertia of its normal stable formula which is the result of the maturity of its growth development or is a derivative therefrom as in the case of starch, first mentioned.

Such a product will be found to show no indication of unstable oxygen but will be found to act for my purpose as if loosely held oxygen were present. If not completely matured, a certain amount of available oxygen may be found, but on complete maturity of this compound the test for loosely held oxygen shows almost no indication of this reactant. When mixed, for example, as the base of baking powder in which starches have been quite commonly used, it will be found to be perfectly neutral as regards the active principle of the baking powder and yet very materially to assist the baking powder in leavening the batter or mix and improving the character of the cereal ingredients of the pastry or other products produced.

I have found that I may produce the slight oxidizing action of the starchy body as referred to above by the spraying with hydrogen peroxide and then drying the product at a temperature of not over 120° F.

Instead of producing my oxidizing effect by the use of hydrogen peroxide solution I may use other hydrogen peroxide carriers, as for example, organic compounds to which hydrogen peroxide is known to attach itself. Preferably such a compound should not be of a very stable character it being desirable that the peroxide be released definitely but rather slowly and at about the rate of associative assimilation of the carbohydrate used.

The use of an organic carrier of this nature removes the necessity of the repeated treatments usually required where the spraying method is used. For starch with hydrogen peroxide in a solid form, as for example, the unstable addition product of carbamide and hydrogen peroxide, the rate of assimilation might be generally stated to be from two to five weeks depending somewhat on temperature and maintained atmosphere.

While I believe that almost any compound containing or generating hydrogen peroxide can be used by including a treatment which would produce a sufficiently slow state of release to conform to the rate of assimilation of the carbohydrate, I recommend the more gradual and natural process, i. e. the use either of the hydrogen peroxide in its solution form or in an associated solid form as in the carbamide. This latter, although a slow method, seems to provide a timing which is adjusted to conform to the more efficient activation of the carbohydrate used.

I may use other starches or a carbohydrate of a cereal character, as for example, corn flour or other flour. I find that corn flour works very well but for the best results requires a digestive cooking.

As first stated, I am unable to assign any definite chemical formula for my product. Such, I believe, would be very complicated. The oxygen may be taken on at one of the double bonds of the organic compound which constitutes the carbohydrate molecule, or by the slow action of the oxidizer associate bonds of attachment may be generated.

This, if true, apparently gives to that bond a catalytic function or enzymic action so that by reason of this activation the carbohydrate becomes an active factor in the development of natural colloidal action in which it possibly passes oxygen, to impart that slight instability which seems to be helpful in what might be called predigestive preparation.

In preparing my product I modify the carbohydrate base or body for any baking powder as above described. I then utilize this body in substantially the same amount and in the same manner of compounding as in the making of any baking powder.

The resultant product, while still a baking powder as before, will be found to have marked additional advantages. Notably these show an improvement in the size of the biscuit or other product, an improved lightness and a more advanced and developed crust. The texture is improved and the product notably different in fineness and in those general characteristics recognized as perfection in baked products.

My baking powder so produced may be used as in common practice so that the housewife does not have to change recipe or procedure.

I also find that in the development of the gluten of the flour and the resultant improvement in the texture of the product I can obtain a further improvement by having a slight excess of the equivalent acidity of the acid reactant of the baking powder over the alkalinity reactant.

My present invention as herein provided is asserted as of a novelty defined by the claims.

What I therefore claim and desire to secure by Letters Patent is:—

1. As a new culinary product, a baking powder comprising gas producing reactants and an activated starchy diluent also constituting a carrier for oxygen available in gluten improving quantities upon mixing in the batter.

2. As a new culinary product, a baking powder comprising gas producing reactants of acid residual excess, and an activated starchy diluent also constituting a carrier for oxygen available in gluten improving quantities upon mixing in the batter.

In testimony whereof I affix my signature.

AUGUSTUS H. FISKE.